(12) United States Patent
Boyle

(10) Patent No.: US 7,093,695 B1
(45) Date of Patent: Aug. 22, 2006

(54) PARK BRAKE CABLE END ASSEMBLY FOR A DRUM-IN-HAT DISC BRAKE ASSEMBLY

(75) Inventor: Brian Boyle, Farmington Hills, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/812,844

(22) Filed: Mar. 30, 2004

(51) Int. Cl.
*F16D 65/14* (2006.01)

(52) U.S. Cl. .................. 188/2 D; 188/72.9; 188/79.55; 188/106 A; 74/502.6

(58) Field of Classification Search ................ 188/2 D, 188/72.9, 79.55, 79.59, 105, 106 A; 74/502.4, 74/502.6
See application file for complete search history.

(56) References Cited

U.S. PATENT DOCUMENTS

| | | | | |
|---|---|---|---|---|
| 5,180,037 A * | 1/1993 | Evans | ....................... | 188/70 R |
| 5,529,149 A * | 6/1996 | Johannesen et al. | ...... | 188/70 R |
| 6,116,103 A * | 9/2000 | Heckel, Jr. | ................. | 74/89.38 |
| 6,206,148 B1 * | 3/2001 | Capek et al. | ............ | 188/79.51 |
| 6,374,962 B1 * | 4/2002 | Doolittle | ................ | 188/106 F |
| 6,390,248 B1 * | 5/2002 | Ikeda | ....................... | 188/79.55 |
| 6,427,653 B1 * | 8/2002 | Hara et al. | ................ | 123/90.17 |
| 6,464,046 B1 * | 10/2002 | De Vecchi | ............... | 188/79.55 |
| 6,651,789 B1 * | 11/2003 | Loken et al. | ................ | 188/328 |
| 6,679,354 B1 * | 1/2004 | Sherman, II | ............... | 188/2 D |
| 6,739,434 B1 * | 5/2004 | Pontius | ..................... | 188/2 D |
| 6,742,633 B1 * | 6/2004 | Sherman et al. | ......... | 188/79.64 |
| 2002/0003067 A1 * | 1/2002 | Iwata et al. | ................ | 188/71.1 |

* cited by examiner

*Primary Examiner*—Devon Kramer
(74) *Attorney, Agent, or Firm*—MacMillan, Sobanski & Todd, LLC

(57) ABSTRACT

This invention relates to an improved park brake cable end assembly for a drum-in-hat disc brake assembly having a disc service brake and a drum-in-hat parking and emergency brake. The drum-in-hat disc brake assembly includes a backing plate adapted to support a drum brake shoe assembly of the drum-in-hat parking and emergency brake; a caliper bracket adapted support a disc brake caliper assembly of the disc service brake; and a drum-in-hat adapter adapted support a disc brake caliper assembly of the disc service brake. According to a feature of the present invention, the drum-in-hat parking and emergency brake includes a park brake cable end assembly including a lever pivotally supported on a link having an end having a configuration which is adapted to accommodate either a parking brake cable having a S-shaped cable end or a clevis shaped cable end.

17 Claims, 9 Drawing Sheets

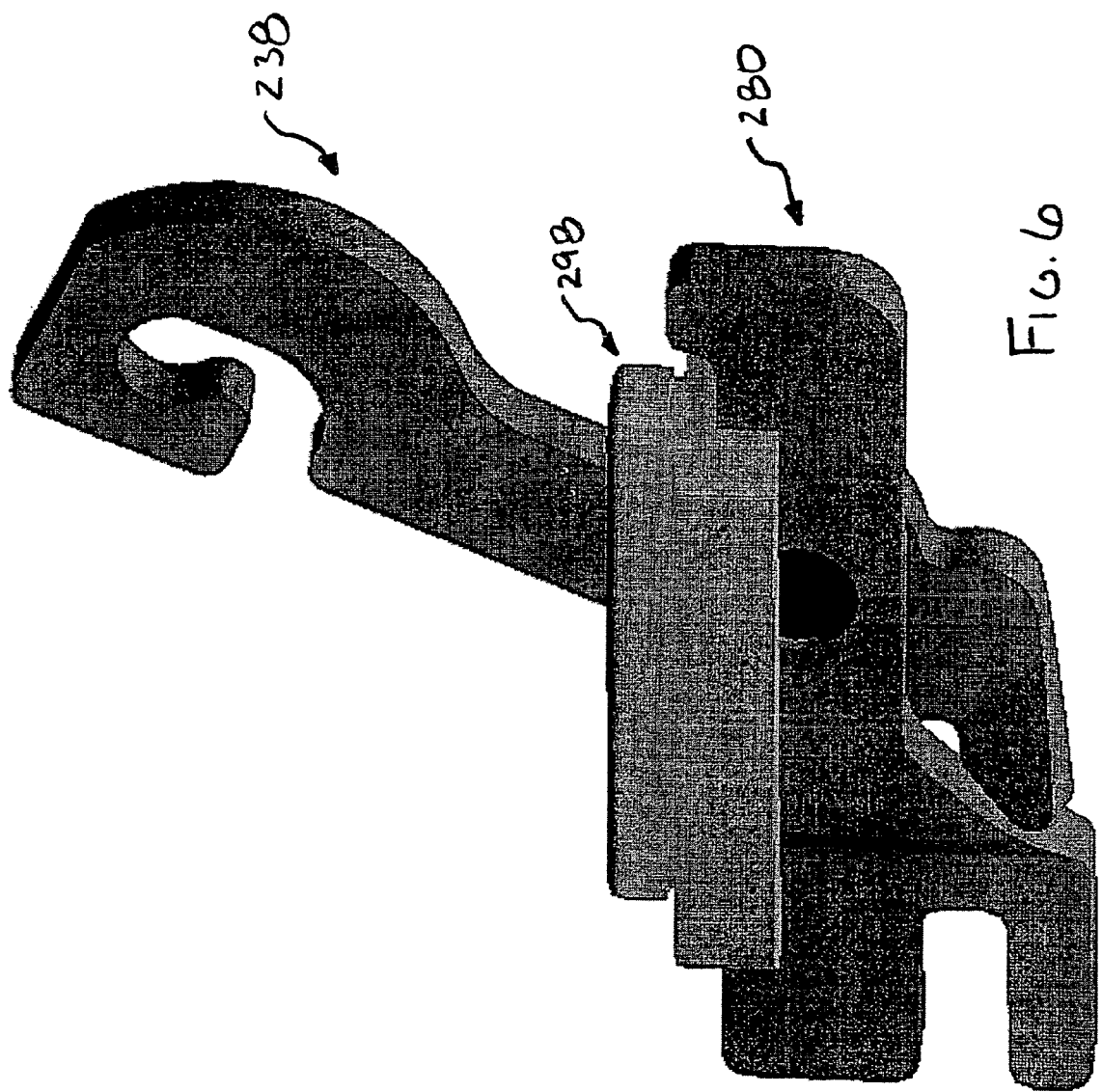

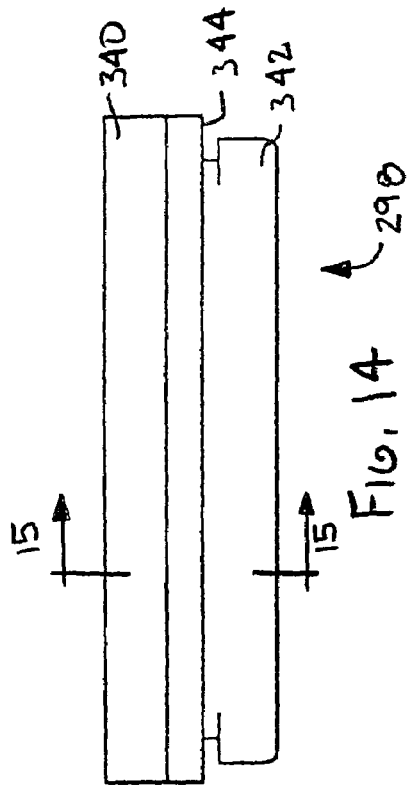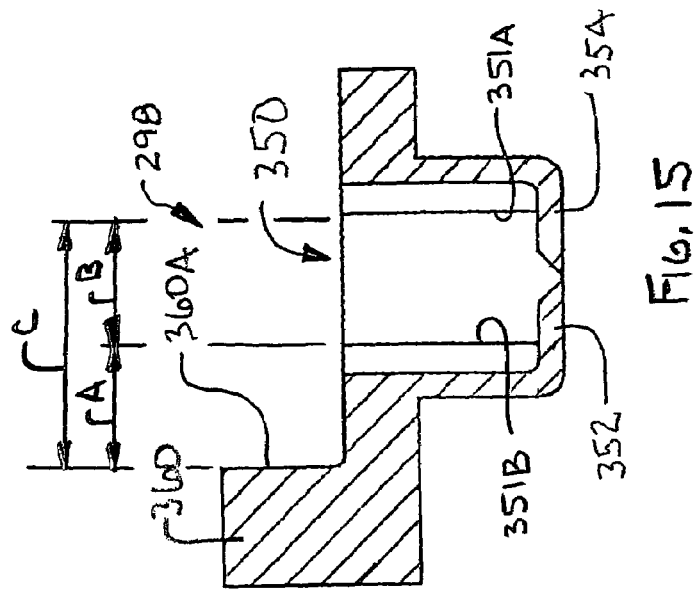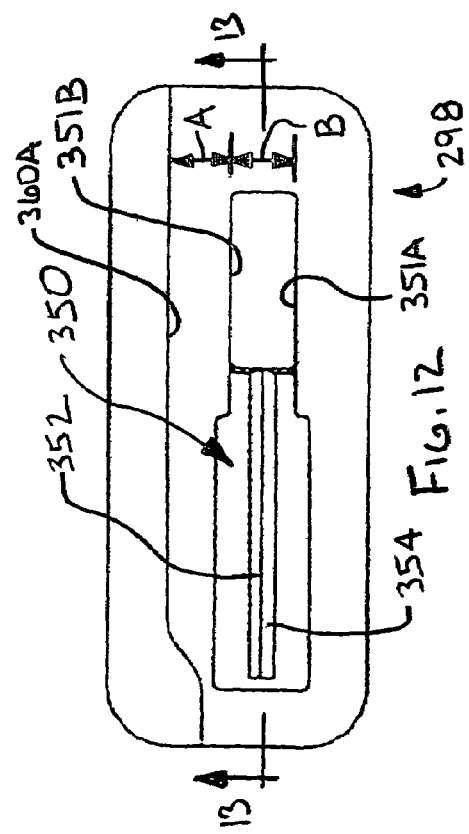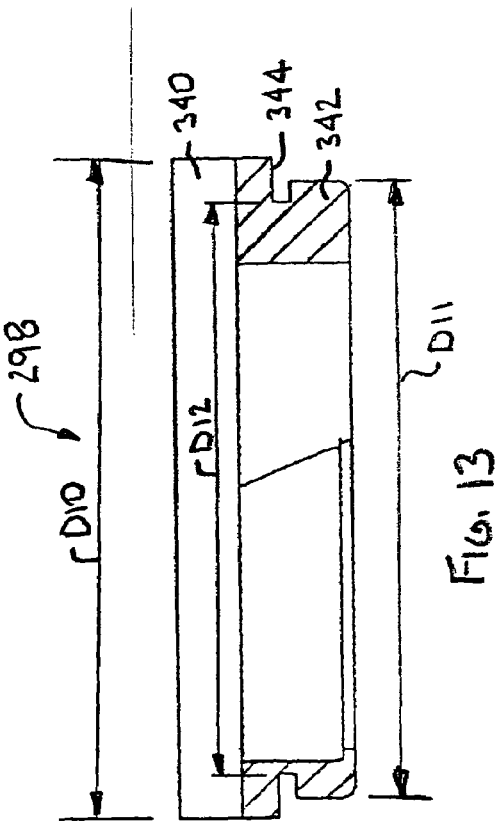

PARK BRAKE CABLE END ASSEMBLY FOR A DRUM-IN-HAT DISC BRAKE ASSEMBLY

BACKGROUND OF THE INVENTION

This invention relates in general to vehicle drum and disc brake assemblies and in particular to an improved structure for a park brake cable end assembly adapted for use in a vehicle drum-in-hat disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

SUMMARY OF THE INVENTION

This invention relates to an improved park brake cable end assembly for a drum-in-hat disc brake assembly having a disc service brake and a drum-in-hat parking and emergency brake. The drum-in-hat disc brake assembly includes a backing plate adapted to support a drum brake shoe assembly of the drum-in-hat parking and emergency brake; a caliper bracket adapted support a disc brake caliper assembly of the disc service brake; and a drum-in-hat adapter adapted support a disc brake caliper assembly of the disc service brake. According to a feature of the present invention, the drum-in-hat parking and emergency brake includes a park brake cable end assembly including a lever pivotally supported on a link having an end having a configuration which is adapted to accommodate either a parking brake cable having a S-shaped cable end or a clevis shaped cable end.

Other advantages of this invention will become apparent to those skilled in the art from the following detailed description of the preferred embodiment, when read in light of the accompanying drawings.

BRIEF DESCRIPTION OF THE DRAWINGS

FIG. 6 is another perspective view of a portion of the vehicle drum-in-hat parking and emergency brake portion illustrated in FIG. 4.

FIG. 12 is a plan view of a boot seal of the drum-in-hat parking and emergency brake portion shown in FIGS. 4–6 in accordance with this invention.

FIG. 13 is a sectional view taken along line 13—13 of FIG. 12.

FIG. 14 is a side view of the boot seal.

FIG. 15 is a sectional view taken along line 15—15 of FIG. 14.

DETAILED DESCRIPTION OF THE PREFERRED EMBODIMENTS

Figure 1:
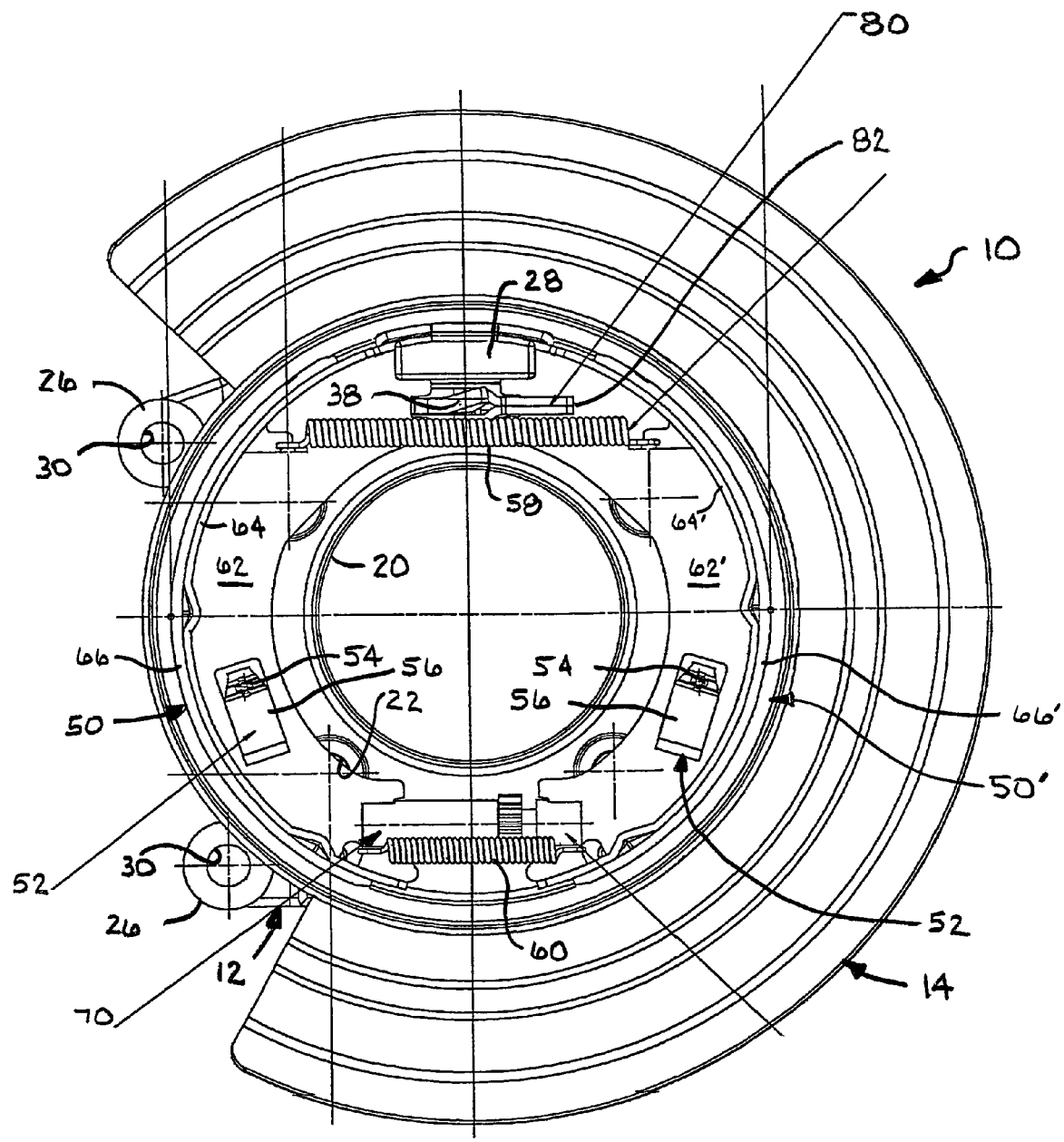
FIG. 1 is a perspective view of a portion of a first embodiment of a prior art vehicle drum-in-hat disc brake assembly.
Figure 2:
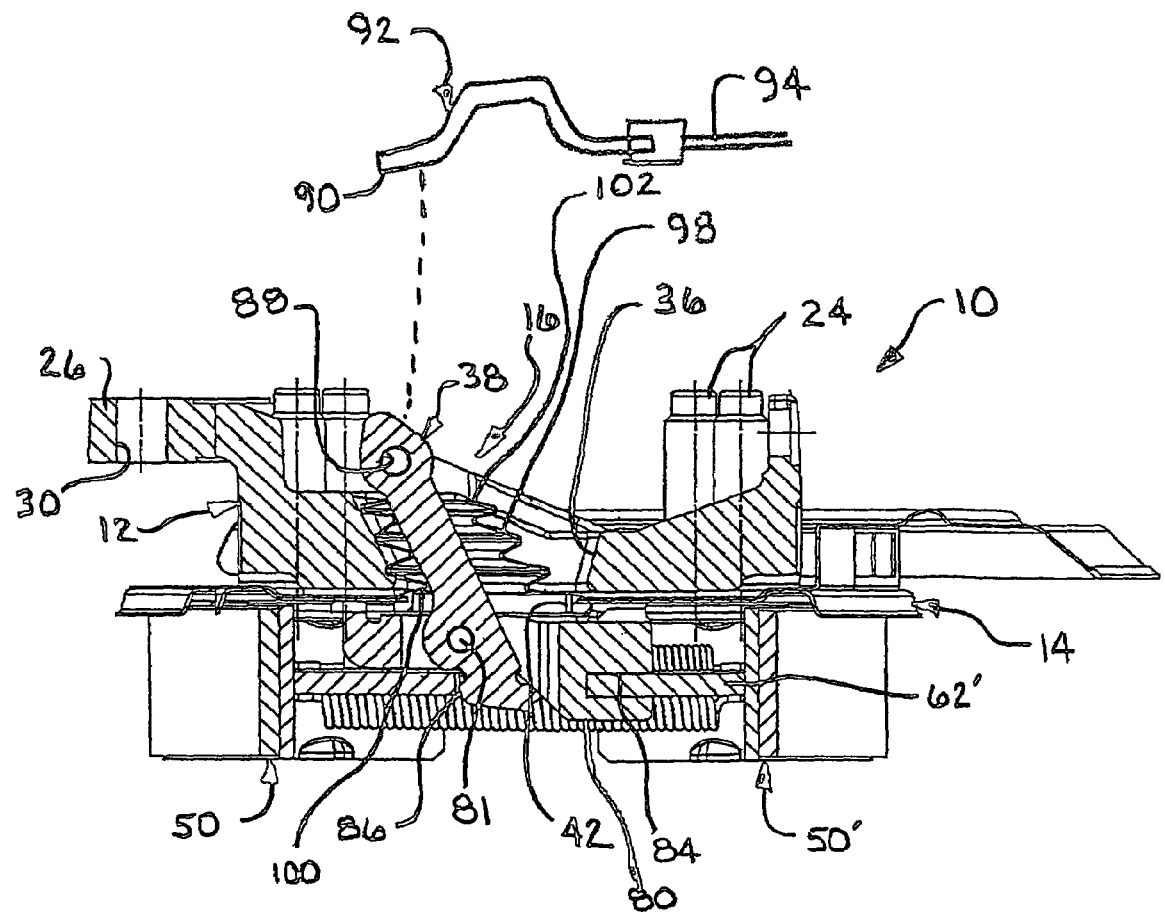
FIG. 2 is sectional view of the vehicle drum-in-hat disc brake assembly illustrated in FIG. 1.

Referring now to the drawings, there is illustrated in prior art FIGS. 1 and 2 a portion of a first embodiment of a prior art vehicle drum-in-hat disc assembly, indicated generally at 10. The prior art vehicle drum-in-hat disc brake assembly 10 includes a hydraulically or pneumatically actuated disc service brake (not shown), and a drum-in-hat parking and emergency brake. In the illustrated embodiment, the prior art vehicle drum-in-hat parking and emergency brake is a sliding shoe type of brake. The general structure and operation of the prior art vehicle drum-in-hat disc brake assembly is conventional in the art. Thus, only those portions of the prior art vehicle drum-in-hat disc brake assembly which are necessary for a full understanding of this invention will be explained and illustrated in detail. Although this invention will be described and illustrated in connection with the particular prior art vehicle drum-in-hat disc brake assembly 10 disclosed herein, it will be appreciated that this invention may be used in connection with other sliding shoe types of drum-in-hat disc brake assemblies in connection with the associated parking and emergency brake portion if so desired.

As shown in prior art FIG. 1, the prior art vehicle drum-in-hat disc brake assembly 10 includes a drum-in-hat adapter 12, a backing plate 14, and a drum-in-hat parking and emergency brake portion, indicated generally at 16 in FIG. 2. The drum-in-hat adapter 12 is illustrated as being a one-piece casting and is adapted to be secured to a fixed, non-rotatable component of the vehicle, such as an axle flange (not shown) or a steering knuckle (not shown) for enclosing a rotatable axle (not shown). To accomplish this, the adapter 12 includes a relatively large opening 20, and a plurality of smaller lug bolt mounting holes 22 (partially shown in FIG. 1), formed therein about the opening 20. The opening 20 permits an outer end of an axle to extend therethrough to the vehicle wheel (not shown), and suitable fasteners 24 (shown in FIG. 2), are disposed in the lug bolt mounting holes 22 to secure the adapter 12 to the associated vehicle component.

The adapter 12 further includes a pair of outwardly extending ears or lugs 26 and an abutment 28. The ears 26 are provided with a hole 30 formed therein. A pair of suitable fasteners (not shown) are disposed in the holes 30 of the ears 26 to attach a disc brake caliper assembly (not shown) to the adapter 12. Alternatively, other structures than the one-piece drum-in-hat adapter 12 illustrated and described herein can be used. For example, a caliper supporting anchor plate, a mounting flange, and a backing plate such as shown in U.S. Pat. No. 5,322,145 to Evans can be used. The illustrated abutment 30 is integrally cast with the drum-in-hat adapter 12.

The drum-in-hat adapter 12 further includes a generally elongated slotted opening 36, shown in prior art FIG. 2. The slotted opening 36 is adapted to allow a lever 38 of a parking brake and emergency brake actuation mechanism (not shown) to extend therethrough.

The illustrated backing plate 14 of the drum-in-hat disc brake assembly 10 is preferably a stamped metal backing plate and includes a relatively large central opening (not shown) and a plurality of smaller openings (not shown) formed therein about the central opening 20 of the drum-in-hat adapter 12. The central opening permits an outer end of the rotatable axle (not shown) to extend therethrough to a wheel (not shown) of the vehicle. The smaller openings are adapted to receive suitable fasteners, such as the threaded mounting studs 24.

The studs 24 extend through the openings formed in the backing plate 14 and the openings 22 drum-in-hat adapter 12, and threaded ends thereof are threadably received in threaded openings (not shown) provided in the associate vehicle component to secure the backing plate 14 and the drum-in-hat adapter 12, and therefore the drum-in-hat disc brake assembly 10, to the associated vehicle component. Alternatively, the backing plate 14 and/or the drum-in-hat adapter 12 can be secured to one another and/or can be secured to the associated vehicle component by other methods.

In the illustrated embodiment, the backing plate 12 also includes a generally elongated, slotted first opening (not shown), a generally elongated, slotted second opening 42. The first slotted opening is adapted to allow the abutment member 28 of the drum-in-hat adapter 12 to extend therethrough. The second slotted opening 42 is adapted to allow the lever 38 of the actuator mechanism of the parking and emergency brake to extend therethrough.

The prior art vehicle drum-in-hat disc brake assembly 1 further includes a pair of brake shoes 50 and 50' supported thereon by conventional pivot pin and spring-clip assemblies, indicated generally at 52. Each of the assemblies 52 includes a pin 54 which extends through an opening (not shown) of the backing plate 14 and through associated opening (not shown) provided in the brake shoes 50 and 50'. The pins 54 have outer ends which are adapted to be fastened or secured to clips 56 of the spring-clip assemblies 52 to secure the brake shoes 50 and 50' to the backing plate 14 in a conventional manner. The illustrated drum-in-hat brake assembly 10 also includes a pair of retraction springs 58 and 60.

The drum-in-hat parking and emergency brake portion 16 of the brake assembly 10 includes the pair of brake shoes 50 and 50' supported on the backing plate 14. Structurally, the brake shoes 50 and 50' are essentially mirror images of one another, and like reference numbers are used to indicate similar parts. The brake shoes 50 and 50' include respective web portions 62 and 62' which are generally flat and crescent-shaped. Generally arcuate-shaped rim portions 64 and 64' are secured to the opposed outer curved surfaces of the web portions 62 and 62', such as by welding. A friction pad 66 is secured to the outer arcuate surface of the rim portion 64 of the brake pad 50, while a friction pad 66' is secured to the outer arcuate surface of the rim portion 64 of the brake pad 50'. The prior art vehicle drum-in-hat parking and emergency brake 10 further includes a manual adjusting mechanism, indicated generally at 70, to compensate for thinning of the friction pads 66 and 66' resulting from wear caused by repeated use.

As best shown in prior art FIG. 2, the lever 38 is pivotally supported on a link assembly 80 by a pivot pin 81. The link assembly 80 and the lever 38 are supported between the upper ends of the web portions 62 and 62' of the brake shoes 50 and 50', respectively. The link assembly 80 includes a first end 82 having a slot 84 formed therein to receive a portion of the web 62' of the brake shoe 50' to operatively couple the link 80 to the brake shoe 50'. The lever 30 includes a portion 86 which is operatively disposed adjacent a portion of the web 62 of the brake shoe 50. The lever 38 is provided with an opening 88 which is adapted to receive an end 90 of a known generally S-shaped hook member 92 which is operatively connected via an actuation cable 94 to a manually operated parking and emergency brake actuation device (not shown, i.e., a driver operated hand lever or foot pedal), for manually actuating the parking and emergency brake. Alternatively, other known constructions of the link assembly 80 can be used.

The drum-in-hat parking and emergency brake portion 16 further includes a boot seal 98 formed from a flexible material and having a first end 100 and a second end 102. The first end 100 is operatively attached to the backing plate 14 and the second end 102 is operatively attached to the park brake lever 38. A plurality of flexible convolutions are provided in the boot seal 98 between the first and second ends thereof. The boot seal 98 is provided to prevent water, dirt, and other contaminants from entering into the interior of the drum-in-hat disc brake assembly 10 through the second slotted opening 42 of the backing plate 14 and the elongated slotted opening 36 of the drum-in-hat adapter 12.

In operation, when the lever 38 is actuated (i.e., moved to the right in prior art FIG. 2 via the actuation cable 94), the link assembly 80 and the lever 38 cooperate to engage and operatively move the brake shoes 50' and 50 outwardly into engagement with an inner cylindrical braking surface (not shown) of a drum-in-hat brake rotor brake in a known manner. Specifically, the link assembly 80 engages and moves or expands the brake shoe 50' outwardly (to the right in FIG. 2) and the lever portion 86 engages and moves or expands the brake shoe 50 outwardly (to the left in FIG. 2).

Figure 3:
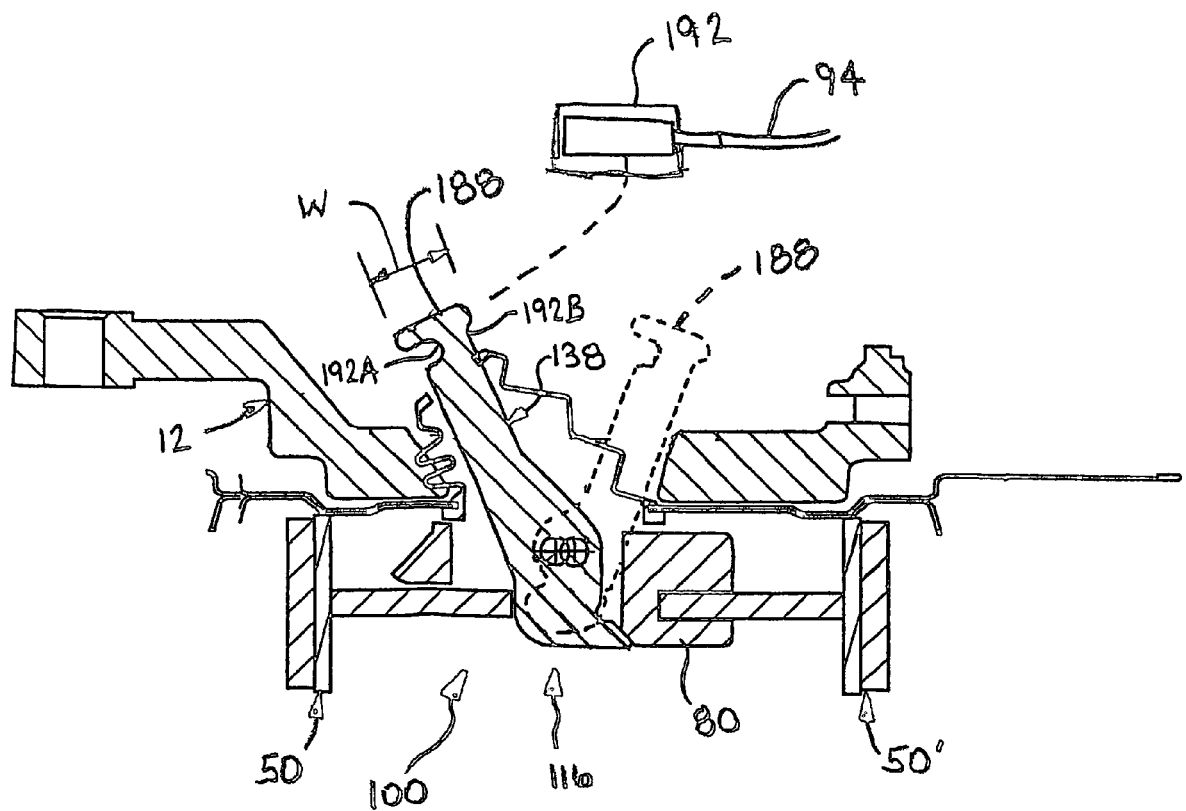
FIG. 3 is sectional view similar to FIG. 2 of a portion of a second embodiment of a prior art vehicle drum-in-hat disc brake assembly.

Referring now to prior art FIG. 3 and using like reference numbers to indicate corresponding parts, there is illustrated a portion of a second embodiment of a prior art vehicle drum-in-hat disc brake assembly, indicated generally at 100, including a second embodiment of a prior art drum-in-hat parking and emergency brake portion 116. In this embodiment, the prior art drum-in-hat parking and emergency brake portion 116 includes a lever 138 having an end 188 adapted to receive a known generally clevis member 192 which is operatively connected via the actuation cable 94 to a manually operated parking and emergency brake actuation device for manually actuating the parking and emergency brake. The end 188 of the lever 138 defines an end width W and includes a pair of offset or inset surfaces relative thereto. Specifically, the end 188 includes a first relatively deep offset 192A and an opposite second relatively shallow offset 192B which enable the clevis member 192 to be releasably and reliably connected to the end 188 of the lever 138. The construction of the prior art vehicle drum-in-hat brake assemblies 10, including the prior art drum-in-hat parking and emergency brake portions 16 and 116, thus far described are conventional in the art.

Figure 4:
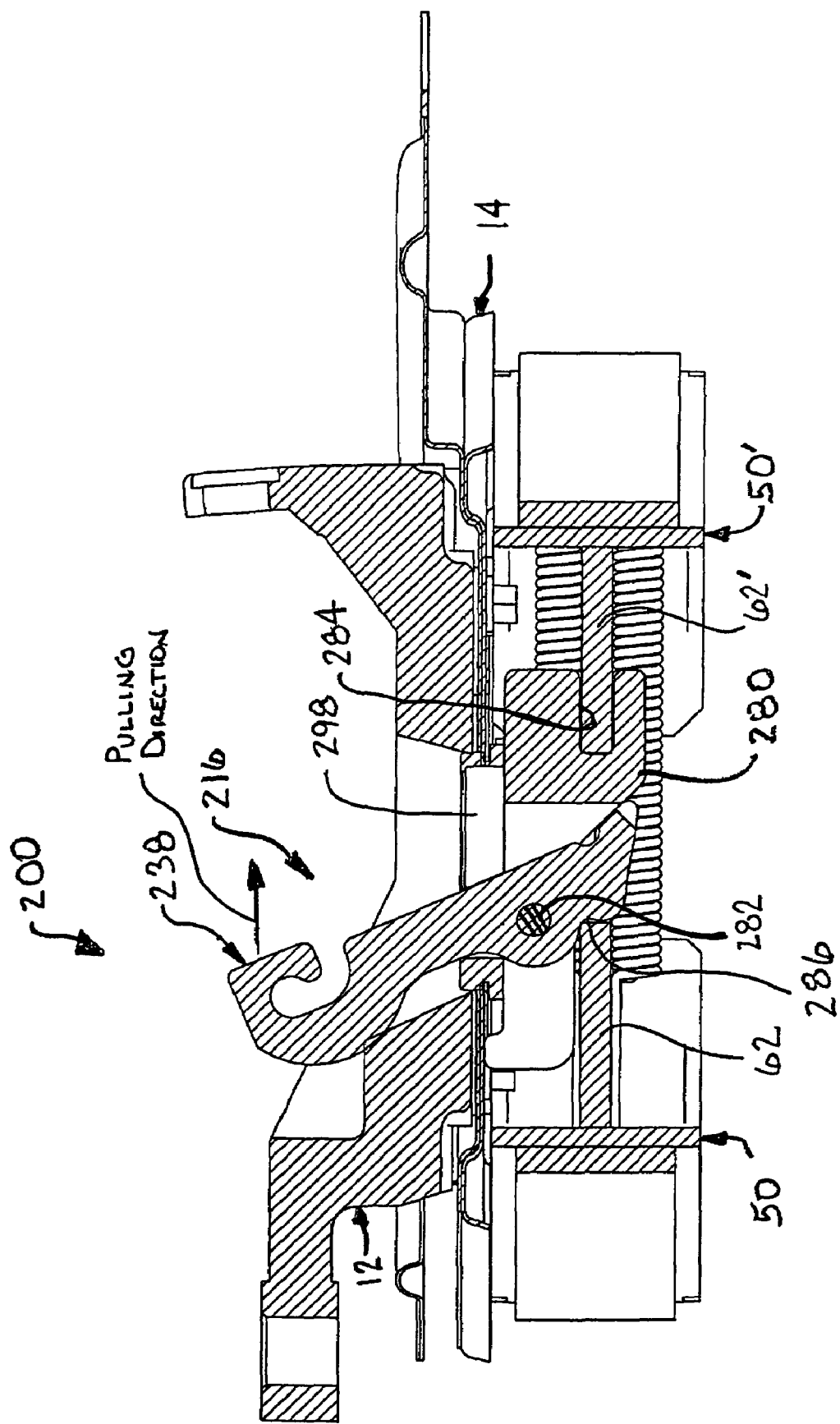
FIG. 4 is a view of a portion of a first embodiment of a vehicle drum-in-hat parking and emergency brake portion for use in a vehicle drum-in-hat disc brake assembly in accordance with this invention.
Figure 5:
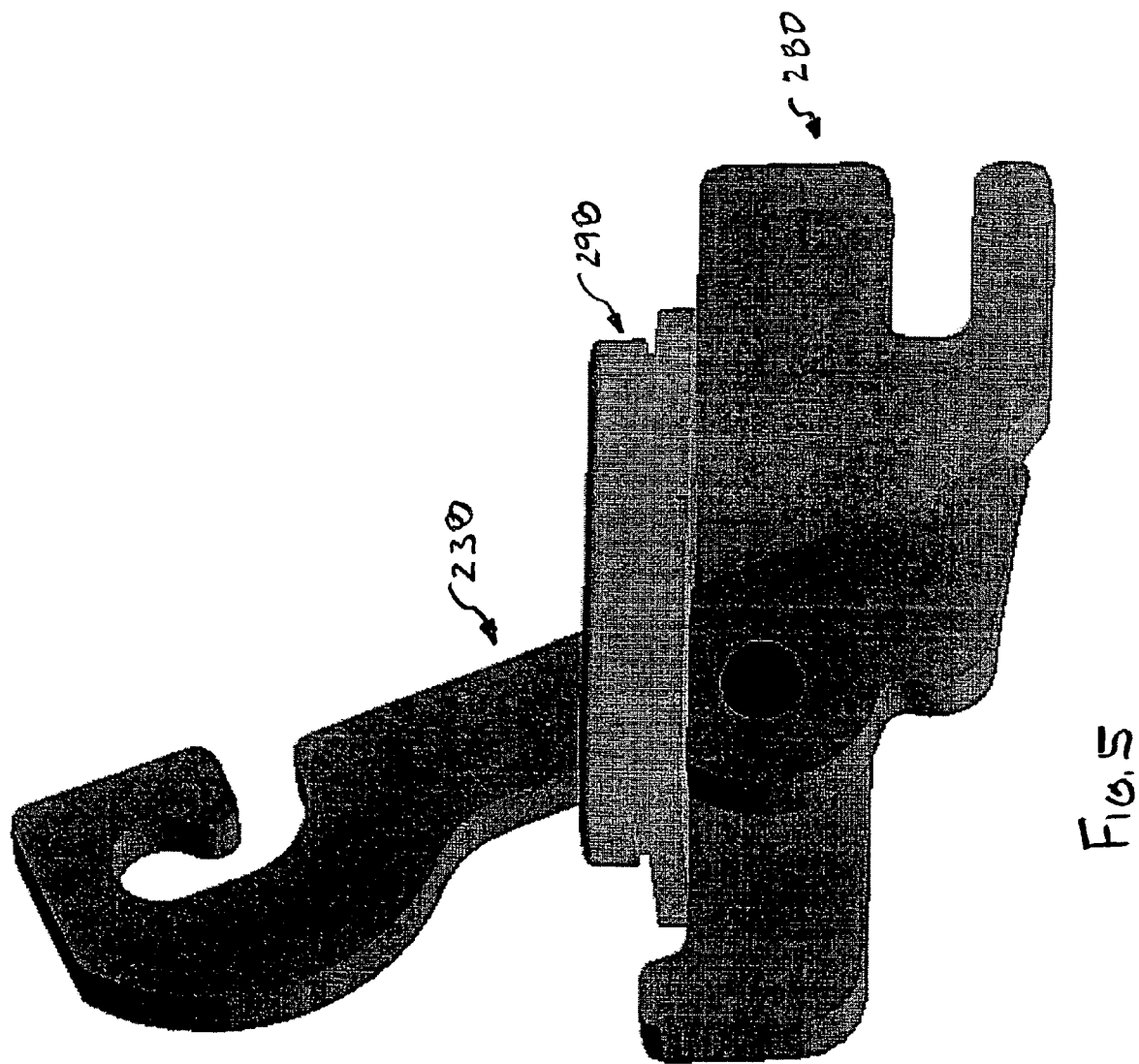
FIG. 5 is a perspective view of a portion of the vehicle drum-in-hat parking and emergency brake portion illustrated in FIG. 4.

Referring now to FIG. 4 and using like reference numbers to indicate corresponding parts, there is illustrated a portion of a vehicle drum-in-hat disc brake assembly, indicated generally at 200, including first embodiment of a vehicle drum-in-hat parking and emergency brake portion, indicated generally at 216, in accordance with this invention. Although the present invention will be illustrated and described in conjunction with the particular vehicle drum-in-hat disc brake assembly disclosed herein, it will be appreciated that this invention can be used in conjunction with other kinds of drum-in-hat vehicle brake assemblies and/or other kinds of vehicle drum brake assemblies having external lever actuated parking brakes.

As shown therein, the vehicle drum-in-hat parking and emergency brake portion 216 includes a lever 238, a link 280, a pivot pin 282 and a boot seal 298. The lever 238 is pivotally supported on the link 280 by the pivot pin 82. The link 280 and the lever 238 are supported between the upper ends of the web portions 62 and 62' of the brake shoes 50 and 50', respectively. The link 280 includes a first end having a slot 284 formed therein to receive a portion of the web 62' of the brake shoe 50' to operatively couple the link 280 to the brake shoe 50'. The lever 230 further includes a notched or recessed portion 286 which is operatively disposed adjacent a portion of the web 62 of the brake shoe 50.

Figure 8:
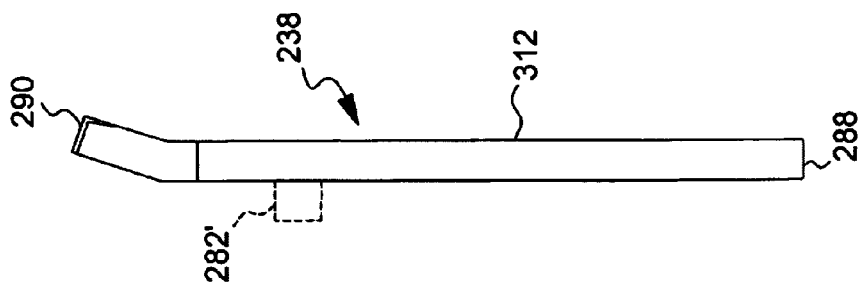
FIG. 8 is a side view of the lever.
Figure 7:
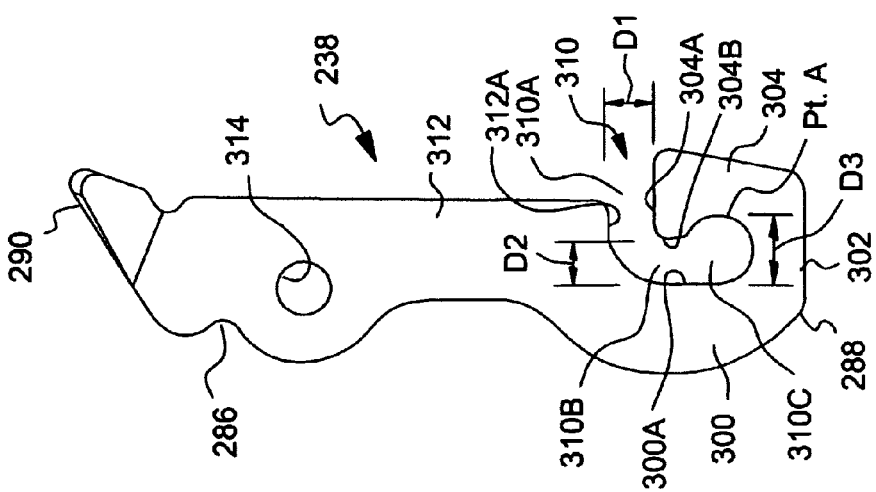
FIG. 7 is a plan view of a lever of the drum-in-hat parking and emergency brake portion shown in FIGS. 4–6 in accordance with this invention.

As best shown in FIGS. 7 and 8, the lever 238 is generally flat and includes a first end 288 and a second end 290 which is slightly angled relative to a main body 312 of the lever 238. The first end 288 is uniquely shaped end for a purpose to be discussed below. In particular, the first end 288 is generally G-shaped (when viewed in FIG. 7) and includes a first or rear portion or leg 300, a bottom or intermediate portion or leg 302, and a second or front portion or leg 304. The end 288 includes a uniquely configured slot or opening 310 formed therein. The opening 310 includes a first or outermost opening 310A defining a first opening dimension D1, a second or intermediate opening 310B defining a second opening dimension D2, and a third or innermost opening 310C defining a third opening dimension D3.

Figure 16:
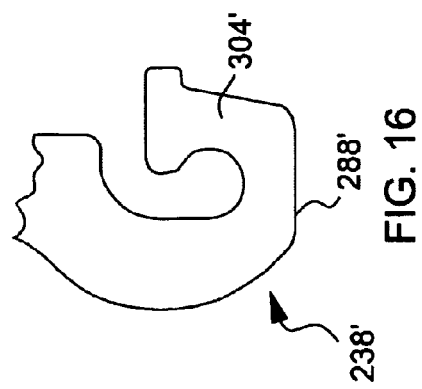
FIG. 16 is a view similar to FIG. 7 showing a second embodiment of a portion of a lever in accordance with this invention.

The first opening dimension D1 is generally constant and is defined between a surface 312A of a main body 312 of the lever 238 and a first surface 304A of the front leg 304. The second opening dimension D2 is generally constant and is defined between a surface 300A of the rear leg 300 and a second surface 304B of the front leg 304. The third opening 310C is generally circular shaped and is non-uniform. In particular, the third opening 310C gradually increases from the second opening dimension D2 to a maximum dimension defined at a Pt. A, and then gradually decreases as it extends toward the bottom leg 302 of the lever 238. In the illustrated embodiment, the third opening dimension D3 is the maximum dimension defined at Pt. A between the surface 300A of the rear leg 300 and a third surface 304C of the front leg 304. The lever 238 further includes an opening 314 formed therethrough. Preferably, the lever 238 is formed from SAE 4140 steel, 5.44/5.19 stock, heat treated to Rc 35–45. Alternatively, the lever 238 can be formed from other suitable materials, such as for example, a high strength low alloy steel or any other suitable metal or non-metal material if desired. Alternatively, the structure of the lever 238 including the specific shape of the opening 310 can be other than illustrated if so desired. For example, as shown in FIG. 16, a lever 238' can be provided having an end 288' with a slightly different shaped front leg 304' compared to the leg 304 shown in connection with the lever 238 in FIG. 7.

Figure 9:
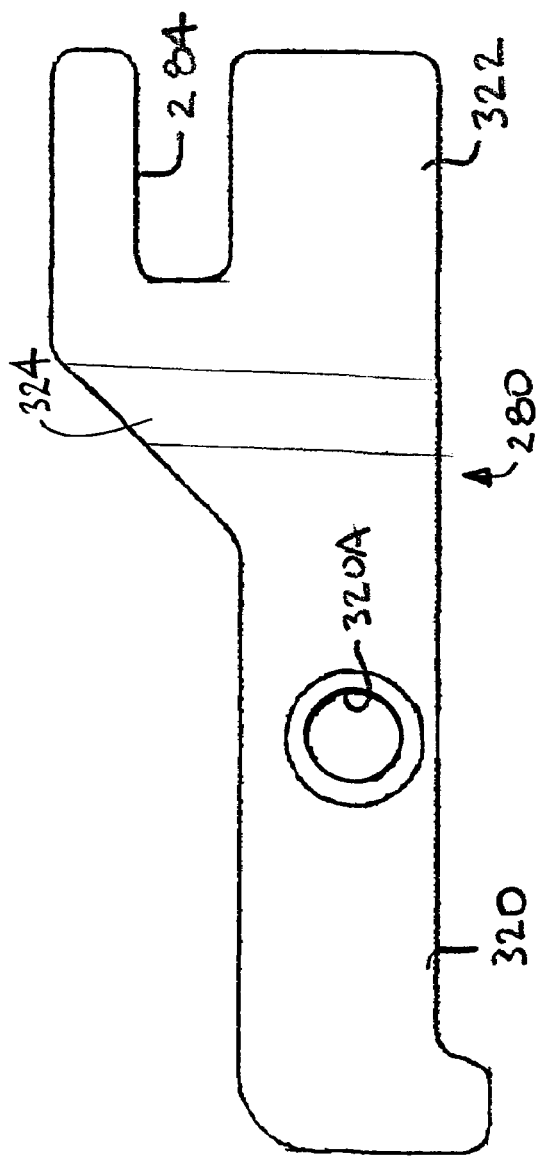
FIG. 9 is a plan view of a link of the drum-in-hat parking and emergency brake portion shown in FIGS. 4–6 in accordance with this invention.
Figure 10:
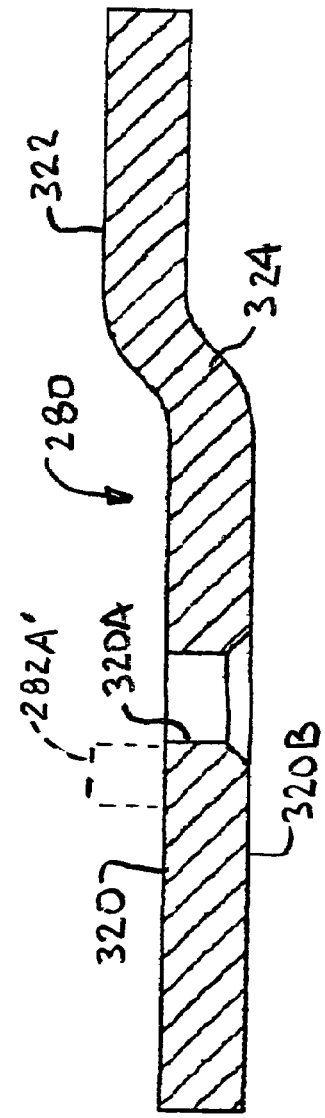
FIG. 10 is a sectional view of the link.

Referring now to FIGS. 9 and 10, the construction of the link 280 will be discussed. As shown therein, the link 280 is stepped and includes a generally flat first portion 320, a generally flat second portion 322, and an angled transition or intermediate portion 324. The first portion 320 includes an opening 320A formed therein. In the illustrated embodiment, the opening 320A is preferably a countersunk opening. Preferably, the link 280 is formed from SAE 4140 steel, 6.44/6.19 stock, heat treated to Rc 35–45. Alternatively, the link 280 can be formed from other suitable materials, such as for example, a high strength low alloy steel or any other suitable metal or non-metal material if desired. Alternatively, the structure of the link 280 including the specific shape of the opening 320A can be other than illustrated if so desired.

Figure 11:
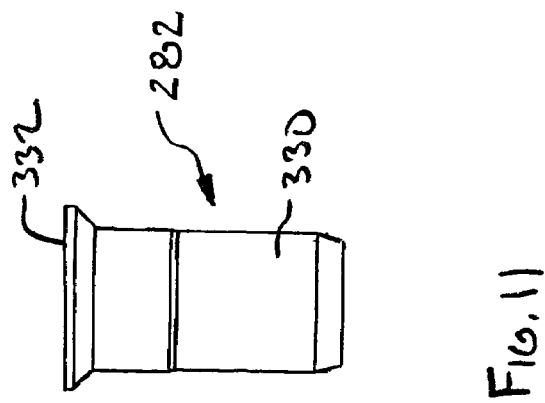
FIG. 11 is a plan view of a pin of the drum-in-hat parking and emergency brake portion shown in FIGS. 4–6 in accordance with this invention.

As best shown in FIG. 11, the pin 282 includes a main body or shank portion 330 and an enlarged flanged head 332. The main body 330 of the pin 282 is adapted to preferably extend through the opening 320A of the link 280 and is press-fit into the opening 314 of the lever 238 to thereby secure the lever 238 to the link 280 for pivotable movement of the lever 238 relative to the link 280. The shape of the flanged head 332 of the pin 282 is complimentary to the shape of the countersunk opening 320A of the link 280 so that the head 332 of the pin 282 is essentially flush with a surface 320B of the link 280. Preferably, the pin 282 is formed from a hardened steel, such as killed steel to SAE 4140, and the main body 330 has a core hardness of Rb 88–100(Hv 185–250) in the center thereof. Alternatively, the pin 282 can be formed from other suitable materials, such as for example, extruded steel. However, forming the pin 282 from hardened steel allows the use of a press-fit installation described above. If the pin 282 is extruded and therefore part of the link 280, it is desirable to heat treat that portion of the lever 238 which receives the pin 282. Alternatively, the structure of the pin 282 can be other than illustrated if so desired. Also, if desired, the pin 282 can be coated with an anti-corrosion material, such as zinc plating, if so desired. In addition, the securing of the lever 238 to the link 280 for pivotal movement relative thereto can be other than illustrated if so desired. For example, the lever 238 can have an extruded pin portion 282' (shown in phantom in FIG. 8), which is operatively connected to the link 280, such as by disposing the pin portion 282' through an opening (which can be similar to the opening 320A shown in FIGS. 9 and 10), and then secured thereto by suitable means, such as for example, by peening, welding or press-fitting. Also, the link 280 could have an extruded pin portion 282A' (shown in phantom in FIG. 10), which is operatively connected to the lever 238, such as by disposing the pin portion 282A' through an opening (which can be similar to the opening 314 shown in FIG. 7), and then secured thereto by suitable means, such as for example, by peening, welding or press-fitting.

Referring now to FIGS. 12–15, the structure of the boot seal 298 will be discussed. As shown therein, the boot seal 298 is generally stepped and includes a first portion 340, a second portion 342, and a shoulder 344 defined at the step of the boot seal 298. The first portion 340 defines a first dimension D10 and the second portion 342 defines a second dimension D11 which is less than the first dimension D10. An annular recess or notch 346 is defined at the step of the boot seal 298 and an inner surface of the notch 346 defines a third dimension D12 which is less than the second dimension D11.

The boot seal 298 includes a generally rectangular shaped normally closed narrow or slit-like opening 350 formed therein. The opening 350 includes a first opening portion defined between a first surface 351A and a second surface 351B and a second opening portion defined between a first lip 352 and a second lip 354. As can be seen in FIG. 12, the lips 352 and 354 normally contact one another and effectively close the opening 350. In operation, the lips 352 and 354 are operative to effectively seal the opening 350 during movement of the lever 238 so as to prevent dirt, water and debris from passing through the opening 350 to the interior of the vehicle brake assembly. The first portion 340 of the boot seal 298 further includes an extension 360 having a surface 360A.

Preferably, a first dimension A is defined between the surface 360A and the surface 351B, and a second dimension B is defined between the surface 351B and 351A. A third dimension C is defined between the surface 351A and 360A such that dimension A plus dimension B equals dimension C. Dimension C (or dimension A plus dimension B), is preferably slightly less than the combined thicknesses of the lever 238 and the link 280. As a result, once the components are assembled, the boot seal 298 is effective or operative to squeeze or press the lever 238 and the link 280 together to prevent them from rattling against one another. Preferably, the boot seal 298 is EPDM elastomer 55–65 IRHD (Shore "A" Duro) hardness. Alternatively, the boot seal 298 can be formed from other suitable materials, such as for example, other EPDM materials or other rubber materials. Alternatively, the structure of the boot seal 298 can be other than illustrated if so desired. Also, the lever 238 of the vehicle drum-in-hat parking and emergency brake portion 216 of the present invention can be used with a conventional boot seal, such as shown at 98 in prior art FIGS. 2 and 3 if so desired.

One advantage of the vehicle drum-in-hat parking and emergency brake portion 216 of the present invention is that the lever 238 is a universal lever, in that the particular shape or geometry of the end 288 of the lever 238 is adapted to accommodate either a parking brake cable having a known S-shaped cable end, such as shown at 92 in prior art FIG. 2, and a known clevis shaped cable end, such as shown at 192 in prior art FIG. 3. Another advantage of the vehicle drum-in-hat parking and emergency brake portion 216 of the present invention is that the boot seal 298 provides a pokeyoke installation of the lever 238, in that once the boot seal 298 is installed, it assures that lever 238 can only be installed in the proper position. Also, the boot seal 298 is operative to reduce or prevent rattle or noise of the lever 238 against the link 280 during vehicle operation.

In accordance with the provisions of the patent statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A drum-in-hat disc brake assembly having a disc service brake and a drum-in-hat parking and emergency brake, the drum-in-hat disc brake assembly comprising:

a backing plate adapted to support a drum brake shoe assembly of the drum-in-hat parking and emergency brake;

a caliper bracket adapted to support a disc brake caliper assembly of the disc service brake; and a drum-in-hat adapter adapted to support a disc brake caliper assembly of the disc service brake;

wherein the drum-in-hat parking and emergency brake includes a park brake cable end assembly including a lever pivotally supported on a link and a parking brake cable operatively connected to said lever, said lever including a main body, a first end and a second generally G-shaped end which is adapted to accommodate either said parking brake cable having a S-shaped cable end or a clevis shaped cable end, said G-shaped end having a rear leg, a bottom leg, a front leg and a slot formed therein, said slot including an outermost opening defined between a first surface of said front leg and a surface of said main body, an intermediate opening defined between a surface of said rear leg and a second surface of said front leg, and an innermost opening defined between said surface of said rear leg and a third surface of said front leg, wherein at least a portion of said surface of said main body is spaced apart from and in overlaying relationship with at least a portion of said first surface of said front leg so as to project over and cover said at least a portion of said first surface of said front leg and wherein when said parking brake cable is connected to said lever said parking brake cable can be pulled only in the direction of said outermost opening of said slot against said front leg.

2. The drum-in-hat disc brake assembly according to claim 1 wherein said lever is pivotally supported on said link via a pivot pin.

3. The drum-in-hat disc brake assembly according to claim 1 wherein said lever includes an extruded pin for pivotally supporting said lever on said link.

4. The drum-in-hat disc brake assembly according to claim 1 wherein said lever includes an extruded pin for pivotally supporting said lever on said link.

5. The drum-in-hat disc brake assembly according to claim 1 wherein said outermost opening defines a first opening dimension, said intermediate opening defines a second opening dimension, and said innermost opening defines a third opening dimension, said first opening dimension being generally constant, said second opening dimension being generally constant, and said third opening dimension being generally non-uniform and gradually increasing from said second opening dimension to a maximum dimension defined generally intermediate said second opening dimension and said third opening dimension, and then gradually decreasing as it extends toward said bottom leg.

6. The drum-in-hat disc brake assembly according to claim 1 further including a boot seal.

7. The drum-in-hat disc brake assembly according to claim 6 wherein said boot seal is operative to squeeze or press said lever and said link together.

8. A drum-in-hat disc brake assembly having a disc service brake and a drum-in-hat parking and emergency brake, the drum-in-hat disc brake assembly comprising:
   a backing plate adapted to support a drum brake shoe assembly of the drum-in-hat parking and emergency brake;
   a caliper bracket adapted to support a disc brake caliper assembly of the disc service brake; and
   a drum-in-hat adapter adapted to support a disc brake caliper assembly of the disc service brake;
   wherein the drum-in-hat parking and emergency brake includes a park brake cable end assembly including a lever pivotally supported on a link and a parking brake cable operatively connected to said lever, said lever including a main body, a first end and a second end having a configuration which is adapted to accommodate either said parking brake cable having a S-shaped cable end or a clevis shaped cable end, said second end having a rear leg, a bottom leg, a front leg and a slot formed therein, said slot including an outermost opening defined between a first surface of said front leg and a surface of said main body, an intermediate opening defined between a surface of said rear leg and a second surface of said front leg, and an innermost opening defined between said surface of said rear leg and a third surface of said front leg, wherein at least a portion of said surface of said main body is spaced apart from and in overlaying relationship with at least a portion of said first surface of said front leg so as to project over and cover said at least a portion of said first surface of said front leg and wherein when said parking brake cable is connected to said lever said parking brake cable can be pulled only in the direction of said outermost opening of said slot against said front leg.

9. The drum-in-hat disc brake assembly according to claim 8 wherein said lever is pivotally supported on said link via a pivot pin.

10. The drum-in-hat disc brake assembly according to claim 8 wherein said lever includes an extruded pin for pivotally supporting said lever on said link.

11. The drum-in-hat disc brake assembly according to claim 8 wherein said outermost opening defines a first opening dimension, said intermediate opening defines a second opening dimension, and said innermost opening defines a third opening dimension, said first opening dimension being generally constant, said second opening dimension being generally constant, and said third opening dimension being generally non-uniform and gradually increasing from said second opening dimension to a maximum dimension defined generally intermediate said second opening dimension and said third opening dimension, and then gradually decreasing as it extends toward said bottom leg.

12. The drum-in-hat disc brake assembly according to claim 8 further including a boot seal.

13. The drum-in-hat disc brake assembly according to claim 12 wherein said boot seal is operative to squeeze or press said lever and said link together.

14. A brake lever adapted for use in a park brake cable end assembly of a parking and emergency brake portion of a drum-in-hat disc brake assembly comprising:
   a lever including a main body, a first end and a second end, one of said first end and said second end having a generally G-shaped end configuration adapted to be operatively connected to either a parking brake cable having a S-shaped cable end or a clevis shaped cable end, said G-shaped end configuration having a rear leg, a bottom leg, a front leg and a slot formed therein, said slot including an outermost opening defined between a first surface of said front leg and a surface of said main body, an intermediate opening defined between a surface of said rear leg and a second surface of said front leg, and an innermost opening defined between said surface of said rear leg and a third surface of said front leg, wherein at least a portion of said surface of said main body is spaced apart from and in overlaying relationship with at least a portion of said first surface of said front leg so as to project over and cover said at least a portion of said first surface of said front leg and wherein when the parking brake cable is connected to said lever the parking brake cable can be pulled only in the direction of said outermost opening of said slot against said front leg.

15. The drum-in-hat disc brake assembly according to claim 14 wherein said outermost opening defines a first opening dimension, said intermediate opening defines a second opening dimension, and said innermost opening defines a third opening dimension, said first opening dimension being generally constant, said second opening dimension being generally constant, and said third opening dimension being generally non-uniform and gradually increasing from said second opening dimension to a maximum dimension defined generally intermediate said second opening dimension and said third opening dimension, and then gradually decreasing as it extends toward said bottom leg.

16. The brake lever according to claim 14 wherein said lever is formed from SAE 4140 steel heat treated to Rc 35–45.

17. The brake lever according to claim 14 wherein one of said first end and said second end of said lever is slightly angled relative to a main body thereof.

* * * * *